2,745,787

RECOVERY AND PURIFICATION OF VITAMIN B₁₂

Jerry Robert D. McCormick, New City, N. Y., and Siegfried A. Muller, Westwood, N. J., assignors to American Cyanamid Company, New York, N. Y., a corporation of Maine No Drawing. Application July 17, 1952,
Serial No. 299,492

8 Claims. (Cl. 167—81)

This invention relates to the recovery and purification of substances having vitamin $B_{12}$ activity and more particularly to the recovery in purified form of vitamin $B_{12}$ materials from impure aqueous solutions of the same.

The utility of vitamin $B_{12}$ materials in the treatment of certain dietary deficiencies is now well established. It has also been established that there are several vitamin $B_{12}$ materials, called cobalamins, which are often found together. These various vitamin $B_{12}$ materials are so chemically and physically similar that a process suitable for the isolation and purification of one is usually suitable for the isolation and purification of others and if several of the vitamin $B_{12}$ factors occur together, recovery processes usually result in the recovery of a mixture of such factors. Since the vitamin $B_{12}$ materials are so closely related chemically and physically and since the new process of this invention is suitable for the isolation of a single vitamin $B_{12}$ factor, or a combination of vitamin $B_{12}$ factors, no distinction will be made between the various related substances showing vitamin $B_{12}$ activity and all will be referred to in this specification and claims simply as vitamin $B_{12}$ materials.

The vitamin $B_{12}$ materials are water-soluble. They are found in very small amounts in several sources but are always contaminated with large amounts of other water-soluble materials. For instance, vitamin $B_{12}$ materials are found in liver concentrates, but the amount of vitamin $B_{12}$ is only a small fraction of the total amount of water-soluble materials in such concentrates. Another example of a source of vitamin $B_{12}$ material is the "beers" which have supported the growth of various microorganisms, such as *Streptomyces aureofaciens, Streptomyces griseus*, or *Eromothecium asbyii;* but here again the vitamin $B_{12}$ activity constitutes only a minute part of the water-soluble material. Separating the vitamin $B_{12}$ materials from such large amounts of water-soluble impurities has been a very difficult problem.

Several procedures have been employed to some extent for the purification and recovery of vitamin $B_{12}$ materials from impure aqueous solutions of the same. For instance, one procedure which has been employed to some extent comprises treating an aqueous solution of the vitamin $B_{12}$ material with an adsorbent material such as alumina, whereby the vitamin $B_{12}$ is adsorbed but many of the impurities are not, and a second procedure which has been employed to some extent comprises solvent extraction of an aqueous solution of impure vitamin $B_{12}$ materials with a selective solvent. Such procedures have several disadvantages. For instance, adsorption upon an adsorbent material requires the use of large quantities of expensive material and also requires the use of a relatively large amount of operating equipment. Selective extraction, as employed in the prior art, suffers from disadvantages such as inefficiency and the necessary use of relatively large quantities of expensive organic solvents. The new process of this invention overcomes many of the above disadvantages and provides a relatively simple, efficient and inexpensive method for recovering vitamin $B_{12}$ materials from impure aqueous solutions of the same.

According to the new process of this invention, an aqueous solution of impure vitamin $B_{12}$ material is treated with a water-soluble salt of a substantially water-insoluble organic carboxylic acid, said carboxylic acid being a solid in the presence of water, the resulting mixture is treated with sufficient mineral acid to free the insoluble carboxylic acid and the resulting solid precipitate is separated and treated to recover the vitamin $B_{12}$ material therefrom. It has been found that the precipitate of free carboxylic acid contains a large percent of the vitamin $B_{12}$ material orginally present in the aqueous solution and that this vitamin $B_{12}$ material can be readily recovered from the precipitate in purified form.

Practically any aqueous solution of impure vitamin $B_{12}$ materials ordinarily encountered in vitamin $B_{12}$ purification can be employed in the new process of this invention. For instance, aqueous liver concentrates can be treated according to the new process of this invention, or fermentation, "beers" of the type previously mentioned can be advantageously employed in the new process. If such a fermentation "beer" is employed it may have been previously treated to separate other valuable material such as antibiotics, it may have been previously treated to increase the percentage of vitamin $B_{12}$, or it may have been previously treated to break up vitamin-protein conjugates. While the above aqueous solutions represent crude sources of vitamin $B_{12}$ in which the vitamin material occurs only in minute amounts, it should be emphasized that the new process is also suitable for treating more concentrated vitamin $B_{12}$ solutions. For instance, an aqueous solution of a partially purified vitamin $B_{12}$ concentrate may be employed in the new process of this invention to obtain a further purification of the vitamin $B_{12}$ material.

The concentration of vitamin $B_{12}$ materials in such aqueous solutions may satisfactorily vary within wide limits. For instance, an aqueous solution containing as little as 0.1 gammas per milliliter of vitamin $B_{12}$ activity may, under optimum conditions, be satisfactorily treated by the new process of this invention. On the other hand, aqueous solutions containing much larger amounts, for instance up to 100 gammas per milliliter, may be satisfactorily employed. As a general rule most advantageous results are obtained if the vitamin $B_{12}$ concentration in the aqueous solution to be treated is between about 0.5 and 50 gammas per milliliter.

A water-soluble salt of almost any organic carboxylic acid which is only slightly water-soluble and which is a solid in the presence of water, can be employed in the new process of this invention. Of course, salts of some substantially water-insoluble carboxylic acids may be more advantageously employed than others due to their desirable physical qualities. For instance, for convenient and efficient operation it is advantageous to employ a salt of a carboxylic acid which is a solid in the presence of water at temperatures below about 80° C. or at least at the temperature at which the procedure is operated. This is because the new process is more efficient when the carboxylic acid separates readily from the aqueous solution in solid form, and by employing acids of the above type, exceptionally low operating temperatures to achieve this result are unnecessary. It has also been found that better results are obtained when employing carboxylic acids of relatively low molecular weight, for instance carboxylic acids having not more than about 12 carbon atoms. This could be due to several factors, but would appear to be primarily due to the fact that salts of exceptionally high weight carboxylic acids tend to form colloidal solutions rather than true solutions. It will also be obvious in view of the above discussion that the lower the water-solubility of the free carboxylic acid, the more efficient is the resulting process. While carboxylic acids having a solubility in water up to about 5 grams per 100 milliliters can be satisfactorily employed, more efficient results are obtained with carboxylic acids having water-solubilities below about 2 grams per 100 milliliters of solution at the temperature employed.

One class of carboxylic acids which can be advantageously employed in the new process of this invention is the aromatic monocarboxylic acids and particularly the monocyclic aromatic monocarboxylic acids as illustrated by salicylic acid, nitrobenzoic acid and p-hydroxybenzoic acid. The aromatic dicarboxylic acids, and particularly the monocyclic aromatic dicarboxylic acids as illustrated by o-phthalic acid, also give superior results in the new process of this invention. A third class of carboxylic acids which is preferred for the new process of this invention is the aralkyl carboxylic acids as illustrated by alpha-naphthalene acetic acid. It will be understood that while these three classes of carboxylic acids are preferred, other carboxylic acids possessing the characteristics outlined in the preceding paragraphs, are also satisfactory.

Practically any water-soluble salt of acids of the above type may be employed. As a general rule the sodium salts of such acids are preferred because of the excellent degree of solubility and because of the relative inexpensiveness of such salts. However, other salts of such acids may be employed, such as their salts with other alkali metals, or in some instances, their salts with alkaline earth metals, for instance calcium. Of course water-soluble salts of such acids with amines, for instance piperidine and morpholine, or ammonium bases, for instance ammonium hydroxide, may also be employed since practically the only requirements of the salt are that it be water-soluble and that it be capable of releasing the free substantially water-insoluble carboxylic acid upon treatment with a mineral acid.

The amount of the salt which is employed can be varied within relatively wide limits. For instance, a quantity of salt equal to the solubility of said salt in the aqueous solution to be treated can be employed, if desired, but more efficient results can be obtained if the quantity of carboxylic acid salt employed is below about ½ gram per milliliter. The minimum quantity of salt which can be employed depends upon the water-solubility of the free carboxylic acid since, of course, a quantity of salt must be employed which is sufficient to liberate the carboxylic acid in excess of its solubility in the aqueous solution. As a general rule more advantageous results can be obtained by employing the salt in amounts above about 5 milligrams per milliliter.

The operating conditions may also vary within relatively wide limits. For instance, a temperature from about 0° C. to about 80° C. can be satisfactorily employed with the preferred range being 20° C. to 50° C. With some carboxylic acid salts, even lower operating temperatures are advantageous since the solubility of the free carboxylic acid usually decreases with decreasing temperature and since the free carboxylic acid often separates more readily as a solid from the aqueous solution at low temperatures. The pH of the aqueous solution to be treated may also vary within wide limits. Of course, the operating pH should never be allowed to go above about pH 10 nor below about pH 1 since, as is known to those skilled in the art, vitamin $B_{12}$ materials are increasingly unstable at hydrogen ion concentrations outside of this pH range. Although reasonable care is necessary to make certain that the hydrogen ion concentrations of solutions of vitamin $B_{12}$ material are maintained within such a pH range, no pH measurements are actually necessary for the operation of the new process of this invention. Of course if the aqueous solution of impure vitamin $B_{12}$ material is highly acidic, a partial precipitate of the free carboxylic acid will be obtained when the carboxylic acid salt is added, but this does not prevent the satisfactory operation of the process.

The pH adjustment necessary for the liberation of the free carboxylic acid may be made with practically any mineral acid. The preferred mineral acids are hydrochloric and sulfuric for reasons of convenience and economy. Other mineral acids which may be satisfactorily employed include phosphoric and nitric. The mineral acid should preferably be employed in a quantity which, calculated from the quantity of salt employed, is sufficient to result in the precipitation of substantially all of the water-insoluble carboxylic acid. If desired, a reasonable excess of mineral acid may be employed, but in such instances care should be exercised to maintain the solution more basic than about pH 1 to avoid destruction of the vitamin $B_{12}$ materials.

The precipitate of free carboxylic acid containing vitamin $B_{12}$ activity can be separated by any of the known procedures for separating solids from liquids, such as filtration, decantation, or centrifugation. A quite satisfactory procedure has been found to be to separate the precipitate from the majority of the aqueous solution by decantation and to then remove additional liquids from the precipitate by centrifugation.

Separating the vitamin $B_{12}$ materials from the precipitate of free carboxylic acid can be accomplished in a number of satisfactory ways. A quite satisfactory procedure comprises treating the precipitate with a mixture of an aqueous solvent for the vitamin $B_{12}$ material and a water-immiscible organic liquid which is a solvent for the free carboxylic acid, but which is a nonsolvent for vitamin $B_{12}$ materials. Organic liquids which are usually suitable for this purpose include ether and lower water-insoluble alcohols, such as butanol. By treating the precipitate with such a mixture of liquids, the carboxylic acid is transferred to the organic phase and the purified vitamin $B_{12}$ material is transferred to the aqueous phase.

The invention will be more particularly illustrated by the following specific examples in which all parts are by weight unless otherwise indicated.

*Example I*

To 5 parts by volume of a concentrated aureomycin effluent liquor containing 1.3 gammas of vitamin $B_{12}$ activity per milliliter (by *Lactobacillus leichmanii* assay) there was added 0.5 part by weight of ortho-phthalic acid dissolved in about 5 parts by weight of saturated sodium bicarbonate solution. The pH of the mixture was then adjusted to 1.7 with concentrated hydrochloric acid, and the resultant precipitate centrifuged. The supernatant was found to contain only 0.13 gammas of $B_{12}$ per milliliter and the precipitate contained about 70% of the $B_{12}$ vitamin activity originally present in the crude solution. The vitamin $B_{12}$ activity was separated from the carboxylic acid by slurrying the precipitate in water and extracting with butanol whereby the carboxylic acid was transferred to the organic phase while the major part of the vitamin $B_{12}$ activity remained in the aqueous phase.

*Example II*

To 20 parts by volume of the same effluent liquor as mentioned in Example I there was added 2 parts by weight of a solution containing 0.5 part by weight of sodium salicylate per milliliter, and the pH was adjusted to 1.2 with concentrated hydrochloric acid. The precipitate was filtered off and washed with a small amount of water. The procedure was repeated on the filtrate. The filtrate from the second precipitate contained 18% of the original $B_{12}$ activity. The combined precipitates were slurried in 4 parts by volume of water and the aqueous phase extracted with 3 portions of ether. The aqueous phase contained 55% of the original $B_{12}$ activity and had a dry-basis potency of 290 gammas of $B_{12}$ activity per gram of total solids.

Example III

To 5 parts by volume of the same effluent liquor as in Examples I and II there was added 0.5 part by volume of 3,5-dinitrobenzoic acid dissolved in 2 parts by volume of saturated sodium bicarbonate solution. The pH was then adjusted to 1.7 with concentrated hydrochloric acid. The centrifuged precipitate contained 67% of the original activity, while 22% remained in the supernatant liquor. the vitamin $B_{12}$ activity was separated from the carboxylic acid by slurrying the precipitate in water and extracting with ether whereby the carboxylic acid was transferred to the organic phase while the major part of the vitamin $B_{12}$ activity remained in the aqueous phase.

Example IV

A 10 parts by volume portion of an aureomycin effluent liquor was filtered at pH 1.8. The filtrate assayed 1.6 gammas of $B_{12}$ per milliliter. To this was added 2 parts by volume of a 20% solution of sodium p-hydroxybenzoate. This raised the pH to 3.7. Concentrated hydrochloric acid was added to pH 1.8. The centrifuged precipitate contained 45% of the original activity and the supernatant contained about 53%. The vitamin $B_{12}$ activity was separated from the carboxylic acid by slurrying the precipitate in water and extracting with ether whereby the carboxylic acid was transferred to the organic phase while the major part of the vitamin $B_{12}$ activity remained in the aqueous phase.

Example V

To 1 milliliter of a pink colored vitamin $B_{12}$ solution there was added 0.4 milliliter of a saturated solution of potassium hydrogen phthalate in saturated sodium bicarbonate solution. Then 2 drops of concentrated hydrochloric were added. After several minutes a pink colored precipitate was centrifuged off and washed twice with 1 milliliter of water. The mother liquor plus the washes contained 1.35 gammas of $B_{12}$, while the precipitate contained 10.4 gammas of $B_{12}$.

Example VI

To a 1 milliliter portion of a pink colored vitamin $B_{12}$ solution there was added 0.1 milliliter of a saturated solution of alpha-naphthalene acetic acid in saturated sodium bicarbonate solution. On addition of 2 drops of concentrated hydrochloric acid a light pink solid appeared. This was centrifuged off and washed twice with 1 milliliter of water. The precipitate contained 9.3 gammas of vitamin $B_{12}$ and the supernatant plus the washes, 18 gammas.

We claim:

1. The process which comprises adding to an aqueous solution of impure vitamin $B_{12}$ material, said aqueous solution containing from about 0.1 to 100 gammas of vitamin $B_{12}$ per ml. and said aqueous solution having a pH of from about 1 to about 10 inclusive and having a temperature of from about 0° C. to about 80° C., a quantity of a water-soluble salt of a water-insoluble carboxylic acid, said quantity of water-soluble salt being from about 0.005 to about 0.5 gram per ml. of said aqueous solution, said carboxylic acid being a benzene carboxylic acid having not more than two carboxyl groups, not more than twelve carbon atoms and containing a benzene ring, and said carboxylic acid being a solid in the presence of water at temperatures below about 80° C., treating the resulting solution with sufficient mineral acid to result in the precipitation of free insoluble carboxylic acid, separating the resulting solid precipitate, contacting said precipitate with a combination of an aqueous solvent and a water-immiscible organic liquid, said organic liquid being a solvent for said carboxylic acid but a non-solvent for vitamin $B_{12}$ materials, and separating the two phases whereby an aqueous solution of purified vitamin $B_{12}$ material is obtained.

2. The process of claim 1 wherein said salt is a sodium salt and said mineral acid is hydrochloric acid.

3. The process of claim 1 wherein said organic liquid is butanol.

4. The process of claim 1 wherein said carboxylic acid is p-hydroxybenzoic acid.

5. The process of claim 1 wherein said carboxylic acid is salicylic acid.

6. The process of claim 1 wherein said carboxylic acid is 2,5-dinitrobenzoic acid.

7. The process of claim 1 wherein said carboxylic acid is o-phthalic acid.

8. The process of claim 1 wherein said carboxylic acid is alpha-naphthalene acetic acid.

References Cited in the file of this patent

UNITED STATES PATENTS

| | | |
|---|---|---|
| 2,563,794 | Rickes | Aug. 7, 1951 |
| 2,631,143 | Braker | Mar. 10, 1953 |

OTHER REFERENCES

Jackson: Journal of the American Chemical Society, vol. 73, Jan. 1951, pp. 337–341.